July 26, 1960

G. W. RUTHERFORD 2,946,318

AUTOMATIC CLUTCH ENGAGER

Filed Aug. 6, 1958

INVENTOR
GEORGE W. RUTHERFORD

BY Kimmel & Crowell

ATTORNEYS

July 26, 1960

G. W. RUTHERFORD 2,946,318

AUTOMATIC CLUTCH ENGAGER

Filed Aug. 6, 1958

INVENTOR
GEORGE W. RUTHERFORD

BY Kimmel & Crowell

ATTORNEYS

July 26, 1960 G. W. RUTHERFORD 2,946,318
AUTOMATIC CLUTCH ENGAGER
Filed Aug. 6, 1958 3 Sheets-Sheet 3
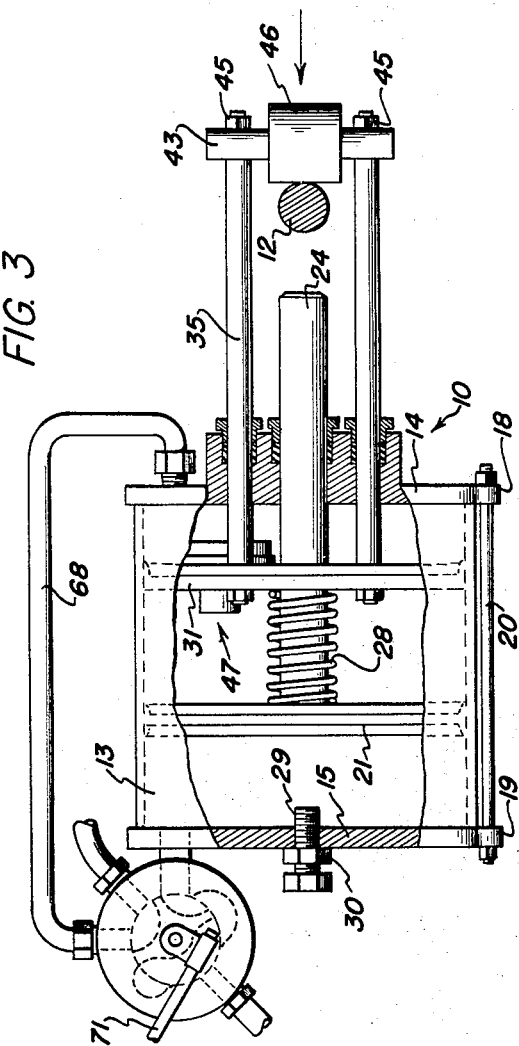
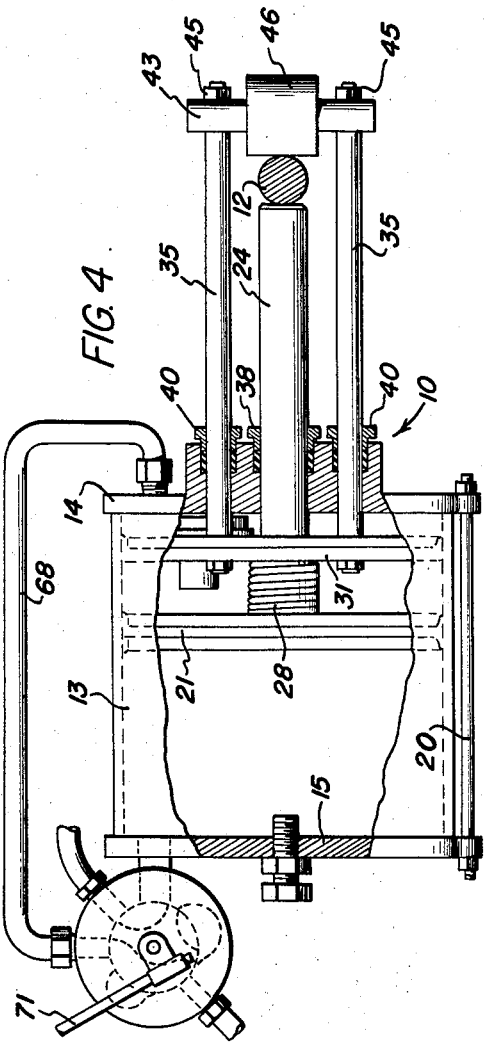
INVENTOR
GEORGE W. RUTHERFORD
BY
Kimmel & Crowell
ATTORNEYS

United States Patent Office 2,946,318
Patented July 26, 1960

2,946,318

AUTOMATIC CLUTCH ENGAGER

George W. Rutherford, Shreveport, La., assignor to The W. L. Somner Company, Incorporated, Shreveport, La.

Filed Aug. 6, 1958, Ser. No. 753,576

5 Claims. (Cl. 121—38)

The present invention relates to automatic clutch engagers, and particularly to a device for engaging and disengaging a clutch under predetermined conditions.

The primary object of the invention is to provide a clutch actuating device which will move the clutch lever to clutch engaged position and relieve the clutch lever from tension while it remains in engaged position.

Another object of the invention is to provide an automatic clutch actuator having power means for moving the clutch lever in both an engaging and a disengaging direction.

A further object of the invention is to provide an automatic clutch engaging device which is operated from the oil pressure of the engine with which the clutch is used.

A still further object of the invention is to provide a hydraulic clutch engaging and disengaging motor having spring means associated therewith for relieving the pressure of the device against the clutch lever when the clutch lever is in clutch engaged position.

Another object of the invention is to provide a device of the class described above which is inexpensive to manufacture, simple to install, and which is completely positive in its action.

Other objects and advantages will become apparent in the following specification when considered in the light of the attached drawings, in which:

Figure 3 is a fragmentary view similar to Figure 2, illustrating the pistons in another position of operation.

Figure 4 is a view similar to Figure 3, illustrating the pistons in yet another position of operation.

Figure 5 is an exploded perspective view of the equalizer valve.

Figure 6 is an end elevation of the invention.

Figure 7 is a fragmentary transverse section taken along the line 7—7 of Figure 2, looking in the direction of the arrows.

Figure 1:
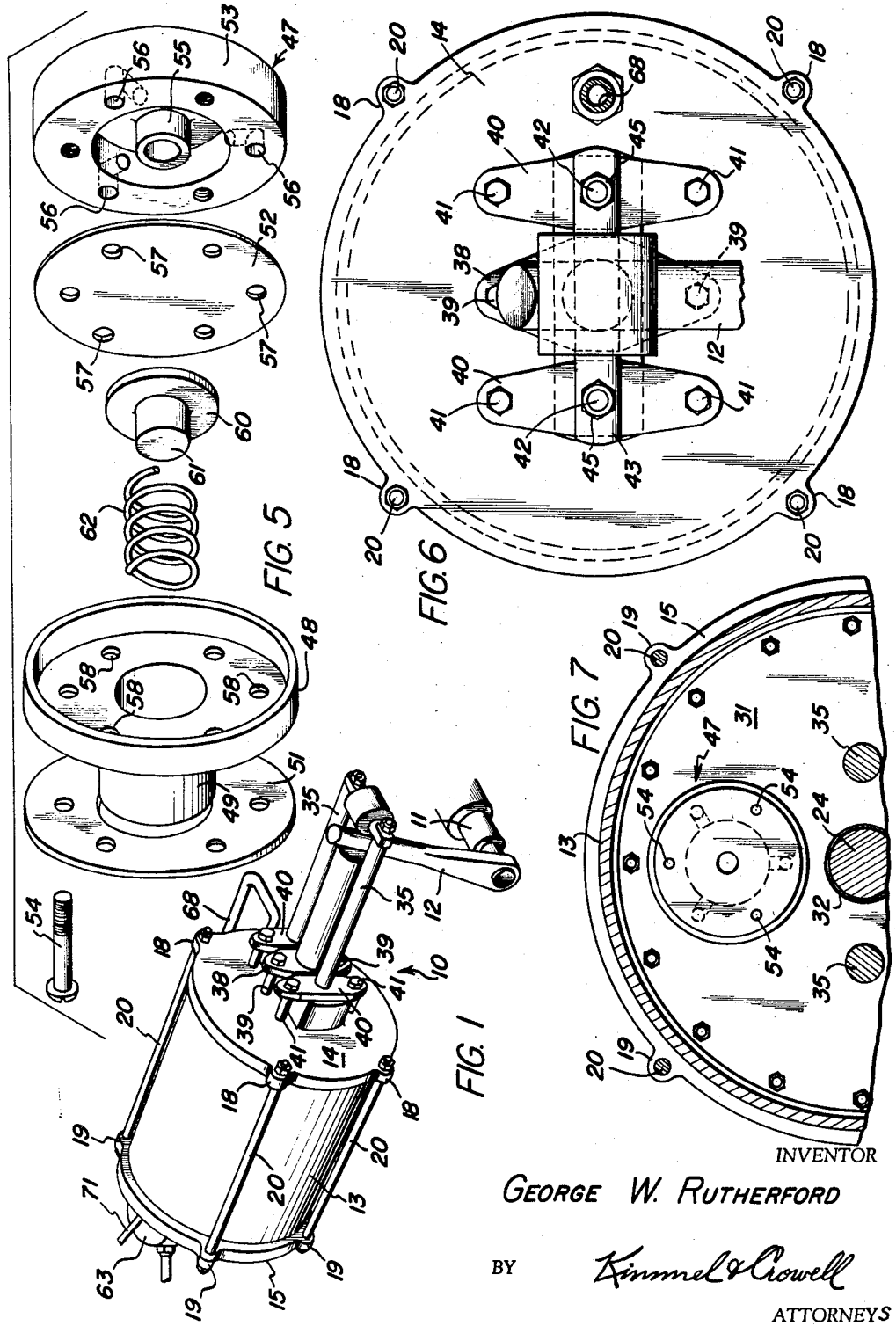
Figure 1 is a fragmentary perspective view of the invention illustrating its association with a clutch lever.

Referring now to the drawings in detail wherein like reference characters indicate like parts throughout the several figures, the reference numeral 10 indicates generally a clutch actuating device constructed in accordance with the invention.

The clutch actuating device 10 is used to operate a clutch of an internal combustion engine with the clutch having a clutch shaft 11 extending outwardly therefrom with a clutch lever 12 secured to its outer end.

Figure 2:
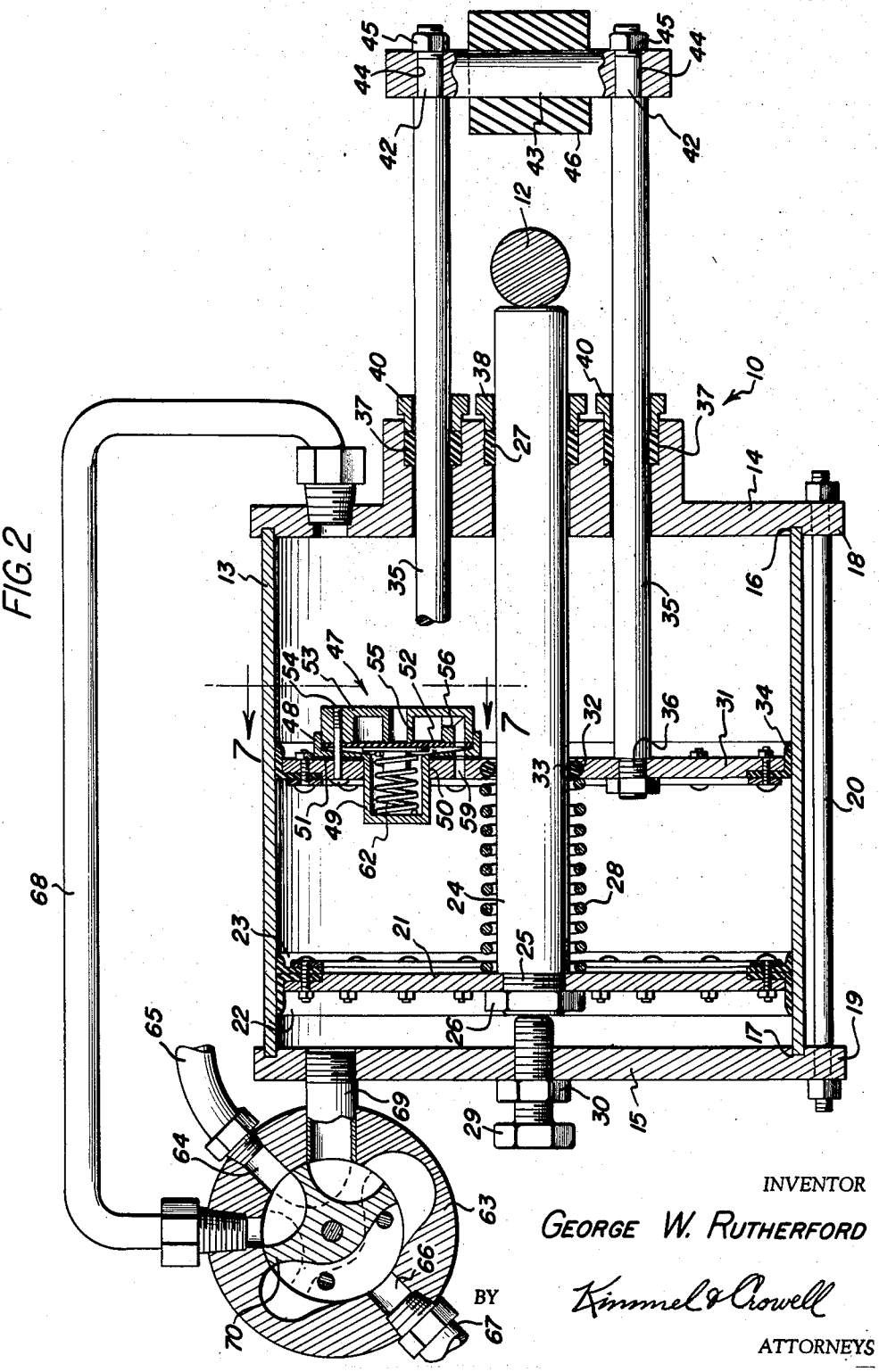
Figure 2 is a fragmentary longitudinal section of the device illustrated in Figure 1 with the equalizer valve illustrated 90 degrees out of position for convenience of illustration.

The structure of the clutch is such that with the clutch lever in the position illustrated in Figures 1 and 4, the clutch is in disengaged position, and with the lever 12 in the position illustrated in Figure 2, the clutch is in engaged position.

The clutch actuating device 10 includes a cylinder 13 having a circular head 14 at one end and a circular base 15 at the other end. The head 14 has an annular groove 16 formed concentric with the axis of the head 14 with the cylinder 13 engaged therein. The base 15 is similarly provided with an annular groove 17 to receive the opposite end of the cylinder 13. The head 14 is provided with a plurality of circumferentially spaced ears 18 integrally mounted on the peripheral edge thereof, and the base 15 is provided with a similar plurality of circumferentially spaced integral ears 19 arranged in aligned relation with respect to the ears 18. An elongated longitudinally extending bolt 20 connects aligned ears 18, 19 to secure the head 14 and base 15 to the opposite ends of the cylinder 13. Suitable seals (not shown) are used in the grooves 16, 17 to prevent leakage therefrom.

A piston 21 is slidably mounted in the cylinder 13 and is provided with sealing cups 22, 23 releasably secured to the peripheral edge thereof and arranged in oppositely extending relation. A piston rod 24 has a reduced threaded end 25 which extends axially through the piston 21 and is secured thereto by a nut 26. The piston rod 24 extends through the center of the head 14 and is sealed for sliding movement therethrough by packing 27.

A coil spring 28 encompasses the piston rod 24 and has one end thereof engaging the piston 21, for reasons to be assigned. A stop bolt 29 extends axially through the base 15 and is provided with a lock nut 30 to secure the stop bolt 29 in adjusted position. The stop bolt 29 is arranged in aligned relation with the piston rod 24 limiting the movement of the piston rod 24 and piston 21 in a direction toward the base 15.

A second piston 31 is slidably mounted in the cylinder 13 and is provided with a central bore 32 through which the piston rod 24 extends. A sealing O ring 33 is mounted in the bore 32 for engagement against the piston rod 24 to prevent leakage between the piston rod 24 and the piston 31. A packing cup 34 is detachably secured to the peripheral edge of the piston 31 and extends in a direction toward the head 14.

A pair of spaced parallel piston rods 35 are each provided with reduced threaded end portions 36 which extend through the piston 31 at radially outwardly equi-spaced points from the axis of the piston 31. The piston rods 35 extend through the head 14 and are sealed against leakage with respect to the head 14 by packing 37. A packing clamp 38 is secured in packing clamping position with respect to the packing 27 by bolts 39. A packing clamp 40 is secured in packing clamping position with respect to the packing 37 by bolts 41.

The piston rods 35 are provided with threaded reduced end portions 42 at the end thereof opposite the threaded reduced end portions 36. A shaft 43 extends transversely of the piston rods 35 and is provided with bores 44 adjacent the opposite ends thereof through which the reduced end portions 42 extend. Nuts 45 are positioned on the threaded end portions 42 securing the shaft 43 thereto. A resilient roller 46 is journalled on the shaft 43 between the piston rods 35 for engagement with the clutch lever 12.

An equalizer valve generally indicated at 47 is associated with the piston 31 to equalize pressures on opposite sides of the piston 31. The equalizer valve 47 is shown in detail in Figure 5. The equalizer valve 47 has a cup shaped body 48 with a cylindrical portion 49 extending axially therefrom. The piston 31 is provided with a bore 50 through which the cylindrical portion 49 extends. An annular gasket 51 is positioned between the piston 31 and the body 48 to prevent leakage therebetween. A flexible diaphragm 52 is positioned in the body 48 and a cylindrical cap 53 engages in the cup shaped body 48 against the diaphragm 52. Bolts 54 extend through the piston 31, cup shaped body 48, diaphragm 52, and cap 53, securing the valve 47 together and to the piston 31.

The cap 53 has a central tubular extension 55 projecting inwardly for contact with the diaphragm 52, as best seen in Figure 2. The cap 53 has a plurality of ports 56 communicating with the central portion thereof and with ports 57 formed in the diaphragm 52, ports 58 formed in the body 48, and ports 59 formed in the piston 31.

A follower 60 is arranged in engagement with the diaphragm 52 on the side thereof opposite the tubular extension 55, and is provided with a cylindrical boss 61 projecting into the cylindrical portion 49. A coil spring 62 encompasses the boss 61 and is seated in the cylindrical portion 49 to normally bias the follower 60 in a direction to maintain the diaphragm 52 in engagement with the tubular extension 55.

With the diaphragm 52 in engagement with the tubular extension 55, passagge of oil from one side of the piston 31 to the other is prevented. When the pressure on one side of the piston 31 is in excess of the desired amount, the spring 62 will be moved by pressure on the diaphragm 52 and follower 60 so that oil can flow through the tubular extension 55, past the diaphragm 52, through the ports 56, 57, 58 and 59 to reach the opposite side of the piston 31. Due to the arrangement of the diaphragm 52, when the pressure becomes too great on the opposite side of the piston 31, the oil can flow in a direction reverse to that described above.

A valve body 63 is provided with an oil input port 64 to which is connected a conduit 65 from the oil pressure system of an internal combustion engine. Oppositely of the input port 64, the body 63 is provided with an outlet port 66 to which is connected a conduit 67 to return oil to the internal combustion engine.

A conduit 68 is connected to the valve body 63 and extends through the head 14 to communicate with one end of the cylinder 13. A second conduit 69 extends from the valve body 63 through the base 15 to communicate with the opposite end of the cylinder 13. A rotatable valve plug 70 is mounted in the valve body 63 and is controlled by a lever 71 connected thereto. The valve plug 70 is arranged to connect the conduit 68 with the conduit 65 while simultaneously connecting the conduit 69 with the conduit 67 in one position while in another position, as shown in dotted lines in Figure 2, the conduit 65 is connected with the conduit 69 while the conduit 67 is connected to the conduit 68. By use of the valve plug 70, pressure can be directed alternately against opposite ends of the cylinder 13.

In the use and operation of the invention, beginning with the elements in the position as illustrated in Figure 4, the lever 71 is swung to align the valve plug so as to connect the conduits 65 and 68, as seen in Figure 2. Oil from the pressure lubrication system of the internal combustion engine will then flow through conduit 68 pressing against the piston 31 so as to move the piston 31 toward the base 15 with the roller 46 pulling the clutch lever 12 toward engaged position.

As the movement of the piston 31 occurs, the piston 21 through the pressure from the spring 28 is also moved toward the base 15 until the reduced end portion 25 of the piston rod 24 engages the bolt 29 in its adjusted position. As the piston 21 ceases to move in the cylinder 13, oil pressure pressing against the piston 31 will compress the spring 28 until the piston 31 can no longer move, whereupon the diaphragm 52 will unseat, permitting oil to flow through the valve 47 until it equalizes on opposite sides of the piston 31. As soon as the oil is equalized on opposite sides of the piston 31, the spring 28 will move the piston 31 in the opposite direction so that the roller 46 will disengage from the clutch lever 12 removing all tension therefrom.

When it is desired to move the clutch lever 12 to disengaged position, the lever 71 is swung to the position illustrated in Figure 4 so that oil pressure from the conduit 65 passes through the conduit 69 and presses against the piston 21. Pressure on the piston 21 will move the piston 21 toward the head 14 to move the clutch lever 12 to a disengaged position. The piston 21 through the spring 28 moves the piston 31 toward the head 14 to the limit of its travel, and further movement of the piston 21 presses the oil from between the pistons 21, 31 through the valve 47 and through the conduit 68 to the valve body 63 and to the return conduit 67. The piston rod 24 maintains the clutch lever 12 in disengaged position until the lever 71 is again swung to the position illustrated in Figure 2.

Figure 4 illustrates the clutch lever in disengaged position with pressure holding the piston 21 at the limit of its travel toward the head 14 in the cylinder 13. Figure 3 illustrates the beginning portion of the stroke to move the lever 12 to engaged position. Figure 2 illustrates the position of the parts after the clutch lever 12 has been moved to engaged position and the roller 46 disengaged therefrom by means of the spring 28.

It should be understood that while the lever 71 has not been illustrated as being automatically actuated that it can be connected to a solenoid operating device forming a part of a control circuit operating the internal combustion engine.

It will be noted that reference herein has been made to oil, but it will be understood that such reference is intended to include air, gas, and water, as the invention can also be so operated. Hence, reference to oil is generic term in this sense.

Having thus described the preferred embodiment of the invention, it should be understood that numerous structural modifications and adaptations may be resorted to without departing from the scope of the appended claims.

What is claimed is:

1. A hydraulic clutch engaging apparatus comprising a cylinder, a first piston slidably positioned in said cylinder having a pair of spaced apart parallel piston rods connected thereto and extending through one end of said cylinder, a second piston slidably positioned in said cylinder on the side of said first piston oppositely of said piston rods, a third piston rod connected axially to said second piston and extending through said first piston and through the end of said cylinder parallel to said pair of piston rods, a coil spring encompassing said third piston rod between said first and second pistons normally biasing said first and second pistons apart, means for selectively supplying oil under pressure to each end of said cylinder, and a spring controlled valve mounted in said first piston for equalizing hydraulic pressures on opposite sides of said first piston, said pair of piston rods being adapted to move a clutch lever in one direction upon movement of said first piston, and said third piston rod being adapted to move said clutch lever in the opposite direction, upon opposite movement of said second piston.

2. A device as claimed in claim 1 wherein adjustable stop means are provided at the other end of said cylinder for limiting the movement of said second piston in a direction away from said first piston.

3. A device as claimed in claim 1 wherein a connecting member having a resilient roller thereon is provided on the ends of said pair of piston rods opposite of said first piston adapted for resiliently engaging the clutch lever to be moved by said first piston.

4. A device as claimed in claim 1 wherein the means for supplying oil under pressure selectively to opposite ends of said cylinder comprises a valve including means for selectively discharging oil from the end of said cylinder opposite to the end of the cylinder which is opposite to the end receiving oil.

5. A device as claimed in claim 1 wherein said valve is provided with a diaphragm actuated by excess pressures on either side of said first piston whereby uneven pressures may be equalized in either direction.

References Cited in the file of this patent

UNITED STATES PATENTS

| | | |
|---|---|---|
| 2,570,434 | Dow | Oct. 9, 1951 |
| 2,575,937 | Bent | Nov. 20, 1951 |

FOREIGN PATENTS

| | | |
|---|---|---|
| 209,999 | Germany | May 15, 1909 |